US008218468B2

(12) United States Patent
Fischer

(10) Patent No.: US 8,218,468 B2
(45) Date of Patent: Jul. 10, 2012

(54) METHOD AND SYSTEM FOR MULTICAST RETRY IN A COMMUNICATION NETWORK

(75) Inventor: Matthew J. Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 825 days.

(21) Appl. No.: 12/209,379

(22) Filed: Sep. 12, 2008

(65) Prior Publication Data

US 2009/0067358 A1    Mar. 12, 2009

Related U.S. Application Data

(60) Provisional application No. 60/971,737, filed on Sep. 12, 2007, provisional application No. 60/987,232, filed on Nov. 12, 2007.

(51) Int. Cl.
*H04H 20/71* (2008.01)
(52) U.S. Cl. .......................................... 370/312; 370/390
(58) Field of Classification Search .................. 370/390, 370/338, 311, 449, 342, 336; 714/749; 455/517
See application file for complete search history.

(56) References Cited

U.S. PATENT DOCUMENTS

| | | | |
|---|---|---|---|
| 7,420,951 B1 * | 9/2008 | Mizell et al. ................... | 370/338 |
| 7,813,324 B1 * | 10/2010 | Goel et al. ..................... | 370/336 |
| 2004/0184427 A1 * | 9/2004 | Lynch et al. ................... | 370/342 |
| 2006/0262794 A1 * | 11/2006 | Livet et al. .................... | 370/390 |
| 2009/0052362 A1 * | 2/2009 | Meier et al. ................... | 370/311 |
| 2009/0207771 A1 * | 8/2009 | Lindskog et al. .............. | 370/312 |
| 2009/0221315 A1 * | 9/2009 | Kim et al. ..................... | 455/517 |
| 2009/0310619 A1 * | 12/2009 | Brommer ....................... | 370/449 |
| 2009/0323646 A1 * | 12/2009 | Ketchum et al. .............. | 370/338 |
| 2010/0153807 A1 * | 6/2010 | Kakani ........................... | 714/749 |

\* cited by examiner

*Primary Examiner* — Kwang B Yao
*Assistant Examiner* — Syed M Bokhari
(74) *Attorney, Agent, or Firm* — Garlick & Markison; Kevin L. Smith

(57) ABSTRACT

Aspects of a method and system for multicast retry in a communication network may include an originator station device within a multicast group that enables transmission of one or more PDUs via a network utilizing a multicast address. The transmitted one or more PDUs may be associated with an identified multicast flow. Subsequent to transmission of the one or more PDUs, the originator station device may receive one or more acknowledgment PDUs. The received acknowledgment PDUs may enable the originator station device to determine whether the transmitted PDUs were successfully received by one or more destination terminal devices. One or more of the PDUs may be retransmitted based on the determination. The originator station device and one or more destination terminal devices may be members of a multicast group. The multicast group may be identified based on the multicast address.

24 Claims, 8 Drawing Sheets

METHOD AND SYSTEM FOR MULTICAST RETRY IN A COMMUNICATION NETWORK

CROSS-REFERENCE TO RELATED APPLICATIONS/INCORPORATION BY REFERENCE

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:
1. U.S. Provisional Application Ser. No. 60/971,737, entitled "Method and System for Multicast Retry in a WLAN," filed Sep. 12, 2007.
2. U.S. Provisional Application Ser. No. 60/987,232, entitled "Method and System for Multicast Retry in a WLAN," filed Nov. 12, 2007.

FIELD OF THE INVENTION

Certain embodiments of the invention relate to communication networks. More specifically, certain embodiments of the invention relate to a method and system for multicast retry in a communication network.

BACKGROUND OF THE INVENTION

IEEE 802.11 describes a communication architecture, which may enable computing devices to communicate via wireless local area networks (WLANs). One of the building blocks for the WLAN is the basic service set (BSS). A BSS may comprise a plurality of computing devices, or stations (STA), which may communicate wirelessly via one or more radio frequency (RF) channels within an RF coverage area. The span of an RF coverage area may be determined based on the distance over which a source STA may transmit data via an RF channel, which may be received by a destination STA.

An independent BSS (IBSS) refers to a BSS, which comprises a set of STAs, which may communicate with each other within the RF coverage area for the BSS. The IBSS is identified by a BSS identifier (BSSID) and a service set identifier (SSID). In an IBSS each STA may engage in direct communication with any of the other STAs within the IBSS. An IBSS may be referred to as an ad hoc network.

An infrastructure BSS refers to a BSS, which may be associated with an extended service set (ESS). The ESS is identified by a service set identifier (SSID). An infrastructure BSS may also be referred to as a BSS. Each of the BSSs within an ESS is identified by a BSS identifier (BSSID). Thus, STAs within a BSS generally determine their association within the BSS based on a BSSID and an SSID.

Each BSS comprises a plurality of STAB and an access point (AP). The AP forms an association with each of the STAs within the BSS. The AP identifies each association by an association identifier (AID). The AP may provide communication services to STAs within a BSS based on the presence of an established association.

Within a WLAN, a STA, referred to as an originating STA, may transmit protocol data units, for example packets or frames, which may each be received by a plurality of STAs, referred to as recipient STAs. This mode of communication may be referred to as multicasting. Typically, the originating STA and recipient STAs form a multicast group. The multicast group may be identified by a multicast address. Any STA within a multicast group may receive PDUs for which the destination address (DA) field within the PDU comprises the multicast address for the multicast group. This multicast address may also be referred to as the multicast group address. For example, an originating STA may multicast PDUs to recipient STAs within the multicast group by transmitting a PDU for which the DA field in the PDU comprises the multicast group address.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for multicast retry in a communication network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for multicast retry in a communication network. In various embodiments of the invention, WLAN station (STA) devices may engage in multicast communications while performing originator and recipient roles, respectively. The originator STA may transmit a plurality of protocol data units (PDUs) that are multicast to one or more recipient STAs within a multicast group. The transmission of multicast PDUs may be preceded by an acknowledged exchange of frames. The acknowledged exchange of frames may enable the originator STA to determine whether to commence transmission of the multicast PDUs. A selected STA, which may or may not be a member of the multicast group, may transmit an acknowledgment PDU subsequent to the transmission of the multicast PDUs. If a transmitted acknowledgment PDU is not detected, a recipient STA within the multicast group may transmit an acknowledgment PDU.

An exemplary embodiment of the invention may be practiced in the field of wireless communications, for example in wireless local area networks (WLANs). However, various embodiments of the invention may not be so limited. Exemplary embodiments of the invention may be practiced, for example, in local area networks (LAN), which utilize wired communication media.

Figure 1:
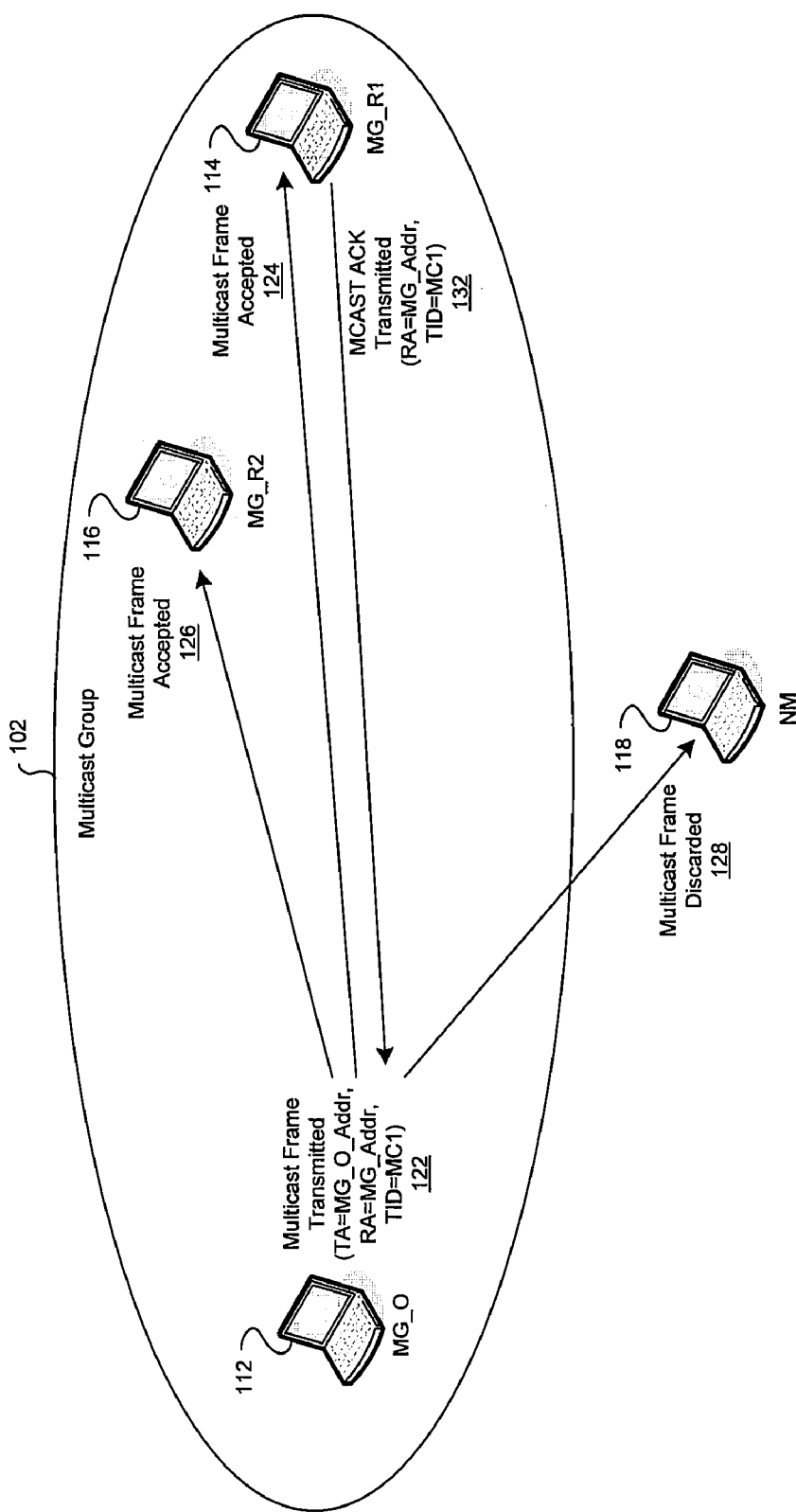
FIG. 1 is a block diagram of an exemplary system for acknowledged multicast communication, in accordance with in an embodiment of the invention.

FIG. 1 is a block diagram of an exemplary system for acknowledged multicast communication, in accordance with in an embodiment of the invention. Referring to FIG. 1, there is shown an exemplary multicast group 102, and a non-multicast group member STA (NM) 118. The multicast group 102 may comprise a multicast group originator STA (MG_O) 112, and multicast group recipient STAs 114 (MG_R1) and 116 (MG_R2). In various embodiments of the invention, any STA within a multicast group 102 may concurrently perform an originator role and a recipient role. The multicast group address associated with the multicast group 102 may be referred to as MG_Addr. In an exemplary WLAN, the STAs 112, 114, 116 and 118 may communicate via a wireless communication medium. In an exemplary LAN, each of the STAs may be communicatively coupled via a wired interface to one or more LAN devices (such as bridges, switches, repeaters and/or direct connection to other STAs). The STAs MG_O 112, MG_R1 and MG_R2, which are members of the multicast group 102 may each accept frames in which the receive address (RA) field comprises MG_Addr.

The STA MG_O 112 may transmit one or more multicast frames 122. The STA MG_O 112 may identify frames that are addressed to each member of the multicast group 102 by sending each transmitted multicast frame 122 with a value RA=MG_Addr. In an exemplary WLAN, the STA MG_O 112 may transmit the multicast frames 122 via a wireless communication medium.

The STA MG_R1 114 may receive one or more of the transmitted multicast frames 122. The STA MG_R1 114 may inspect the RA field within the received multicast frames 122 and determine that the frames comprises a RA field value RA=MG_Addr. The STA MG_R1 114 may then accept the received multicast frames 124. Similarly, the STA MG_R2 116 may receive one or more of the transmitted multicast frames 122, determine that the frames comprise RA=MG_Addr, and accept the received multicast frames 126. The STA NM 128 may also receive one or more of the transmitted multicast frames 122. However, since STA NM 128 is not a member of the multicast group 102, STA NM 128 may discard the received multicast frames 128.

At some time, the STA MG_R1 114 may transmit a multicast acknowledgment (MCAST ACK) 132 to the STA MG_O 112. The MCAST ACK 132 may indicate successful reception and acceptance of one or more of the transmitted multicast frames 122 by the STA MG_R1 114. The RA field within the MCAST ACK 132 may comprise the address of the multicast group address, MG_Addr.

In various embodiments of the invention, a plurality of transmitted multicast frames 122 may be logically grouped, wherein the logical grouping is referred to as a multicast (MCAST) flow. Transmitted frames may be identified as being a part of an MCAST flow based on identifying information contained with fields within each transmitted frame. In an exemplary embodiment of the invention practiced within IEEE 802.11 WLAN systems, an MCAST flow may be uniquely identified based on the recipient STA receive address (RA), transmitting STA address (TA) and transmit flow identifier (TID) fields within each transmitted frame. As shown in FIG. 1, each of the transmitted multicast frames 122 is identified as being part of a common MCAST flow based on the fields TA=MG_O_Addr, RA=MG_Addr, and TID=MC1. The tuple (TA, RA, TID) may uniquely identify a MCAST flow. Based on the field values within the transmitted multicast frames 122, each receiving STA, MG_R1 114 and MG_R2 116, that accepts the transmitted frames may identify the received frames as being part of a common MCAST flow. Each of the transmitted multicast frames 122 may also comprise a sequence number (SN) field. The SN field for each of the transmitted multicast frames 122 may comprise a distinct value, which enables the recipient STAs to determine the order in which the multicast frames 122 are to be received by the STA MG_R1's 114 and/or STA_MG_R2's 116 upper layer protocol stacks.

Based on the received MCAST ACK frame 132, the STA MG_O 112 may determine whether each of the frames transmitted within the MCAST flow has been successfully received and/or accepted by each of the recipient STAs within the multicast group 102. In instances when the STA MG_O 112 determines that one or more frames within the MCAST flow may not have been successfully received and/or accepted by at least one of the recipient STAs within the multicast group 102, the STA MG_O 112 may retransmit one or more previously transmitted frames in the MCAST flow. The retransmission of previously transmitted frames in an MCAST flow may be referred to as MCAST retry.

In an exemplary embodiment of the invention within the context of an IEEE 802.11 WLAN system, a STA, such as STA MG_O 112, which performs in an originator role within the multicast group 102 may communicate an ability to perform MCAST retry to the recipient STAs 114 and 116 by transmitting a frame, such as a beacon frame or an association request frame. The beacon frame and/or association request frame transmitted by the STA 112 may comprise an indication field, for example a bit, which may be set to an indication value. The setting of the indication field to the indication value may enable each recipient STA 114 and 116 to determine that the STA 112 is capable of performing MCAST retry.

In various embodiments of the invention, the indication field may be contained within an information element (IE) defined with an IEEE 802.11 specification. For example, in an exemplary embodiment of the invention, the indication field may be contained with an HT capabilities IE. In another exemplary embodiment of the invention, the indication field may be contained within a vendor specific IE.

In various embodiments of the invention the indication field may be contained within an action frame, wherein the category of the action frame may be defined as vendor specific. In such case, at least a portion of the contents of the action frame may be vendor defined as specified within IEEE 802.11 specifications. The vendor that specifies the contents of the vendor specified action frame may be identified based on the organizationally unique identifier (OUI) field within the vendor specified frame.

Beacon frames, association request frames, action frames and associated IEs, for example the HT capabilities IE, are described in IEEE specification P802.11n/D2.06, which is hereby incorporated herein by reference in its entirety.

The STAs within a multicast group, which are able to support MCAST retry capabilities as recipient STAs, for example by transmitting MCAST ACK frames, may or may not communicate their abilities, referred to as recipient functions, to other STAs within the multicast group. A STA, which is capable of performing recipient functions, may communicate its ability by transmitting an add block acknowledgment (ADDBA) response frame to the originator STA MG_O 112. The ADDBA response frame is described in IEEE standard 802.11-2007, which is referenced in IEEE specification P802.11n/D2.06. The transmitted ADDBA response frame may be referred to as an unsolicited ADDBA response frame in the sense that the STA may transmit the ADDBA response frame without having previously received an ADDBA request frame.

In an exemplary embodiment of the invention, the transmitted ADDBA response frame may comprise a default value in the dialog token field, for example the dialog token field may comprise a value 'FF'. The STA, which transmits the ADDBA response frame may indicate that the ADDBA response frame is unsolicited by setting the reserved field, within the block ACK parameter set field, to a determined value, for example '1'. The set value for the reserved field may also indicate that the ADDBA response frame comprises an extension field. The extension field may comprise the MCAST group address for the multicast group 102, MG_Addr. The block ACK policy field within the block ACK parameter set field may be set to a value, which indicates a delayed block ACK. Other fields in the ADDBA response frame may be set to values as described in IEEE standard 802.11-2007, which is referenced in IEEE specification P802.11n/D2.06.

Figure 2:
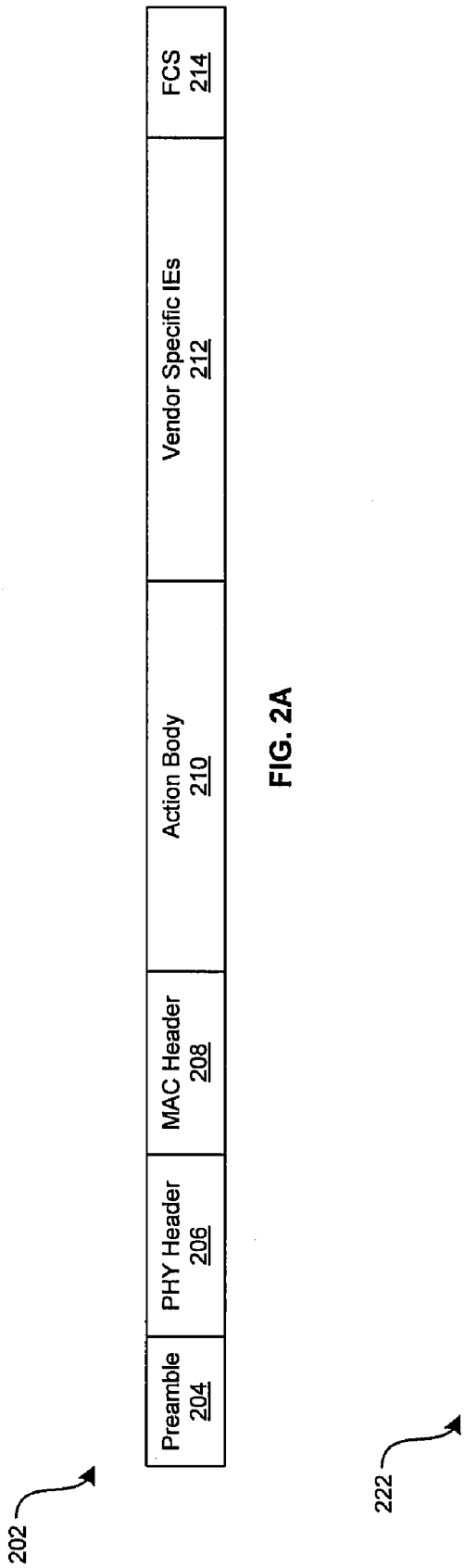
FIG. 2A is a diagram illustrating an exemplary format for an enhanced ADDBA response frame, in accordance with an embodiment of the invention.
FIG. 2B is a diagram illustrating an exemplary format for an action body field within an enhanced ADDBA response frame, in accordance with an embodiment of the invention.
FIG. 2C is a diagram illustrating an exemplary format for a block acknowledgment parameter set field within an enhanced ADDBA response frame, in accordance with an embodiment of the invention.

FIG. 2A is a diagram illustrating an exemplary format for an enhanced ADDBA response frame, in accordance with an embodiment of the invention. Referring to FIG. 2A, there is shown an exemplary ADDBA response frame format 202. The ADDBA response frame format 202 may comprise a preamble field 204, a physical layer (PHY) header field 206, a medium access control (MAC) field 208, an action body field 210, a field comprising vendor specific IEs 212 and a frame check sequence (FCS) field 214.

In an exemplary embodiment of the invention, the preamble field 204 and the PHY header field 206 are specified substantially as described in IEEE standard 802.11-2007. The MAC header field 208, also specified substantially as described in IEEE standard 802.11-2007 may comprise a type field, which indicates that the ADDBA response frame format 202 comprises a management type frame. The MAC header field 208 may also comprise a subtype field, which indicates that the ADDBA response frame format 202 comprises an action type frame. The action body field 210 comprises descriptive contents for the action frame. In an exemplary embodiment of the invention, the action body field 210 may identify the ADDBA response frame 202 to the STA, which receives the ADDBA response frame, for example STA MG_O 112. The vendor specific IEs field 212 and FCS field 214 are specified substantially as described in IEEE standard 802.11-2007. In various embodiments of the invention, a STA may transmit ADDBA response frames in which the vendor specific IEs field 212 is absent.

FIG. 2B is a diagram illustrating an exemplary format for an action body field within an enhanced ADDBA response frame, in accordance with an embodiment of the invention. Referring to FIG. 2B, there is shown an exemplary action body field format 222. In an exemplary embodiment of the invention, the action body field 222 corresponds to the action body field 210 in FIG. 2A. The action body field format 222 may comprise a category field 224, an action field 226, a dialog token field 228, a status code field 230, a block ACK (BA) parameter set field 232, a BA timeout field 234 and an MCAST address field 236.

In an exemplary embodiment of the invention, the category field 224 may comprise a value, which indicates a block ACK category. The action field 226 may comprise a value, which indicates an ADDBA response. The dialog token field 228 may comprise a determined value, such as 0xFF. The status code field 230 may be specified substantially as described in IEEE standard 802.11-2007. The BA parameter set field 232 may be specified substantially as described above. The BA timeout field 234 may be specified substantially as described in IEEE standard 802.11-2007. The MCAST address field 236 may comprise the MCAST group address for the multicast group. In the exemplary embodiment of the invention as presented in FIG. 1, the MCAST address field 236 may comprise the value MG_Addr.

FIG. 2C is a diagram illustrating an exemplary format for a block acknowledgment parameter set field within an enhanced ADDBA response frame, in accordance with an embodiment of the invention. Referring to FIG. 2C, there is shown an exemplary BA parameter set field format 252. In an exemplary embodiment of the invention, the BA parameter set field 252 corresponds to the BA parameter set field 232 in FIG. 2B. The BA parameter set field format 252 may comprise a reserved field 254, a BA policy field 256, a TID field 258, and a buffer size field 260.

As described above, in an exemplary embodiment of the invention, the reserved field 254 may comprise a determined value, for example a binary value equal to one (1). The BA policy field 256 may comprise a determined value, for example a binary value equal to one (1). The TID field 258 may comprise a value, which identifies an MCAST flow. For example, in the exemplary system shown in FIG. 1, the TID field 258 may comprise a value of MC1. The buffer size field 260 may be specified substantially as described in IEEE standard 802.11-2007.

Receipt by an originator STA MG_O 112 of an enhanced ADDBA response frame from any recipient STA within a multicast group 102 may enable the STA MG_O 112 to utilize MCAST retry when transmitting multicast frames 122.

The utilization of MCAST retry within a multicast group 102 may be ended when the originator STA MG_O 112 transmits an enhanced delete block acknowledgment (DELBA) frame to the recipient STAs 114 and 116 within the multicast group 102. The utilization of MCAST retry recipient functions at a recipient STA within the multicast group 102 may be ended when the recipient STA transmits an enhanced DELBA frame to the originator STA MG_O 112. The utilization of MCAST retry within the multicast group 102 may be ended when each recipient STA within the multicast group 102 has transmitted an enhanced DELBA frame to the originator STA MG_O 112. When MCAST retry has been ended, an originator STA MG_O 112, which transmits MCAST frames 122 may not receive an MCAST ACK frame 132 in response to the transmission of MCAST frames 122. When MCAST retry recipient functions have ended at a recipient STA MG_R1 114 within the multicast group 102, the recipient STA MG_R1 114 may not transmit an MCAST ACK frame 132 in response to receipt of one or more MCAST frames 122.

Figure 3:
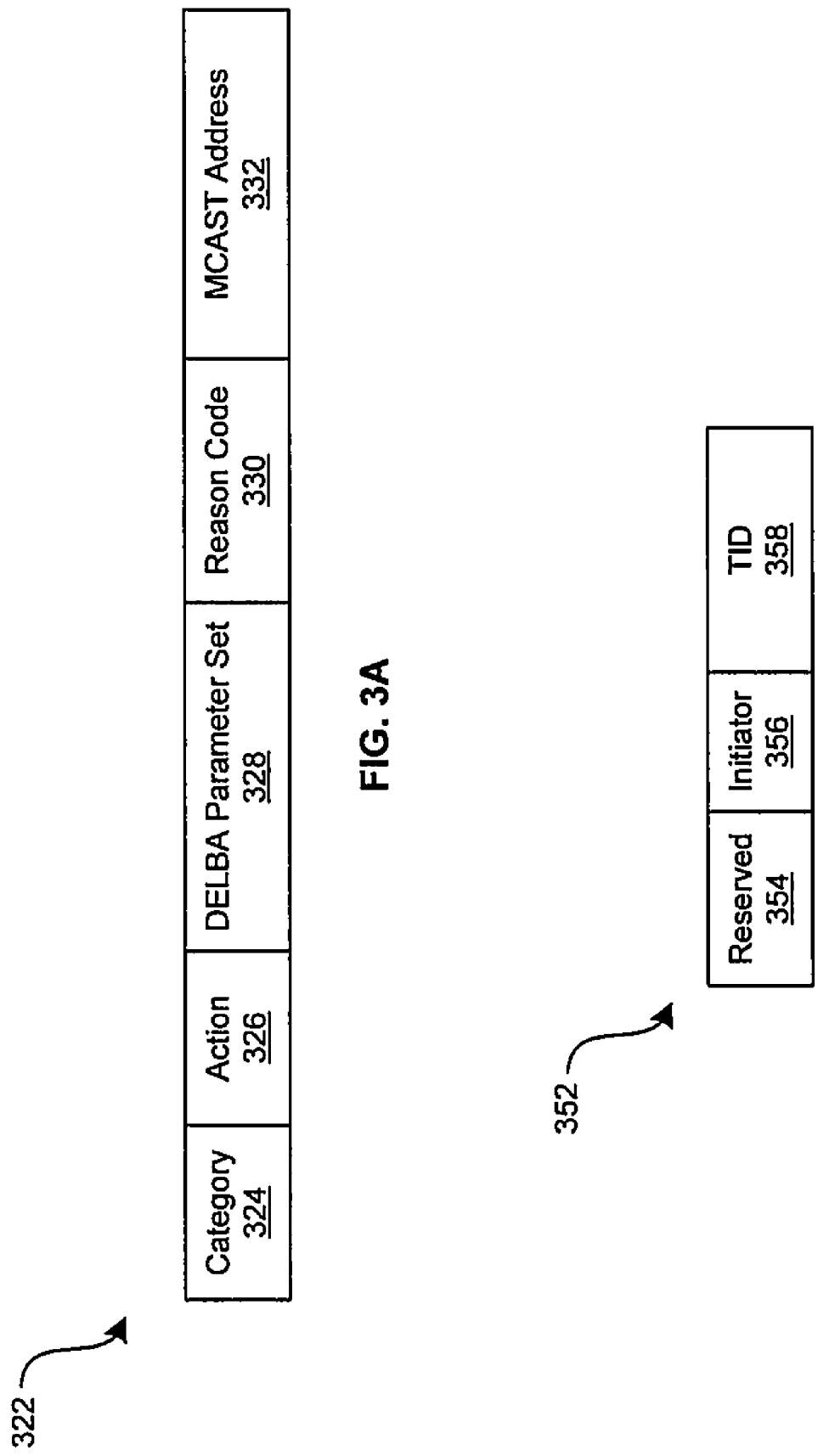
FIG. 3A is a diagram illustrating an exemplary format for an action body field within an enhanced DELBA frame, in accordance with an embodiment of the invention.
FIG. 3B is a diagram illustrating an exemplary format for a DELBA parameter set field within an enhanced DELBA frame, in accordance with an embodiment of the invention.

The enhanced DELBA frame comprises enhancements to the DELBA frame format, wherein the DELBA frame format is substantially described in IEEE standard 802.11-2007. In an exemplary embodiment of the invention, the enhanced DELBA frame format is substantially similar to the enhanced ADDBA frame format 202, however, the action body field 210 in the enhanced DELBA frame differs from the action body field format 222. The action body field in the enhanced DELBA frame is described in FIG. 3.

FIG. 3A is a diagram illustrating an exemplary format for an action body field within an enhanced DELBA frame, in accordance with an embodiment of the invention. Referring to FIG. 3A, there is shown an exemplary action body field format 322. The action body field format 322 may comprise a category field 324, an action field 326, a DELBA parameter set field 328, a reason code field 330 and an MCAST address field 332.

In an exemplary embodiment of the invention, the category field 324 may comprise a value, which indicates a DELBA. The action field 326 may comprise a value, which indicates a DELBA. The BA parameter set field 328 may be specified to indicate an enhanced DELBA as described below. The reason code field 330 may be specified substantially as described in IEEE standard 802.11-2007. The MCAST address field 332 may comprise the MCAST group address for the multicast group. In the exemplary embodiment of the invention as presented in FIG. 1, the MCAST address field 332 may comprise the value MG_Addr.

FIG. 3B is a diagram illustrating an exemplary format for a DELBA parameter set field within an enhanced DELBA frame, in accordance with an embodiment of the invention. Referring to FIG. 3B, there is shown an exemplary DELBA parameter set field format 352. In an exemplary embodiment of the invention, the BA parameter set field 352 corresponds to the DELBA parameter set field 328 in FIG. 3A. The BA parameter set field format 352 may comprise a reserved field 354, an initiator field 356 and a TID field 358.

In an exemplary embodiment of the invention, the reserved field 354 may comprise a determined value that indicates an enhanced DELBA frame. For example the bit in the first bit position within the reserved field 354 may be set to a binary value equal to one (1) to indicate an enhanced DELBA frame. The initiator field 356 may be specified substantially as described in IEEE standard 802.11-2007. The TID field 358 may comprise a value, which identifies an MCAST flow. For example, in the exemplary system shown in FIG. 1, the TID field 358 may comprise a value of MC1.

Various embodiments of the invention may comprise various methods by which one or more recipient STAs within a multicast group 102 may communicate an ability to perform recipient functions. The recipient functions may enable an originator STA MG_O 112 to transmit one or more multicast frames to recipient STAs within a multicast group 102 and to receive an acknowledgment from one or more of the recipient STAs. The acknowledgement comprises one or more indications, which enable the originator STA MG_O 112 to determine whether one or more of the transmitted multicast frames has been successfully received by one or more of the recipient STAs. Consequently, various embodiments of the invention may not be limited to the utilization of enhanced ADDBA response frames and/or enhanced DELBA frames to enable or disable MCAST retry originator functions and/or recipient functions. Various embodiments of the invention may utilize equivalent means, for example by utilizing action frame formats not described above, which enable the communication of information between originator STAs and recipient STAs. The communicated information may enable or disable MCAST retry originator functions and/or recipient functions. In various embodiments of the invention, exemplary information, which may be communicated, comprises an MCAST group address, information which enables the communicating STA to indicate whether an MCAST retry originator function is being enabled or disabled and/or information which enables the communicating STA to indicate whether an MCAST retry recipient function is being enabled or disabled.

Each of the STAs 112, 114, 116 and 118 may comprise one or more processors, memory and/or computer readable storage. For example, the memory and/or computer readable storage within STA 112 may enable the storage of computer programs and/or data that enable the STA 112 to utilize multicast retry communications within a network, such as a LAN or WLAN, in accordance with an embodiment of the invention. For example, one or more processors operable within STA 112 may enable the execution of one or more code sections within the computer program(s) and/or processing of data. The execution of the computer program(s) and/or processing of data may enable the STA 112 to engage in multicast retry communications within a network, in accordance with an embodiment of the invention. Similarly, processors, memory and/or computer readable storage may enable STAs 114, 116 and/or 118 to engage in multicast retry communications within a network, in accordance with an embodiment of the invention.

Figure 4:
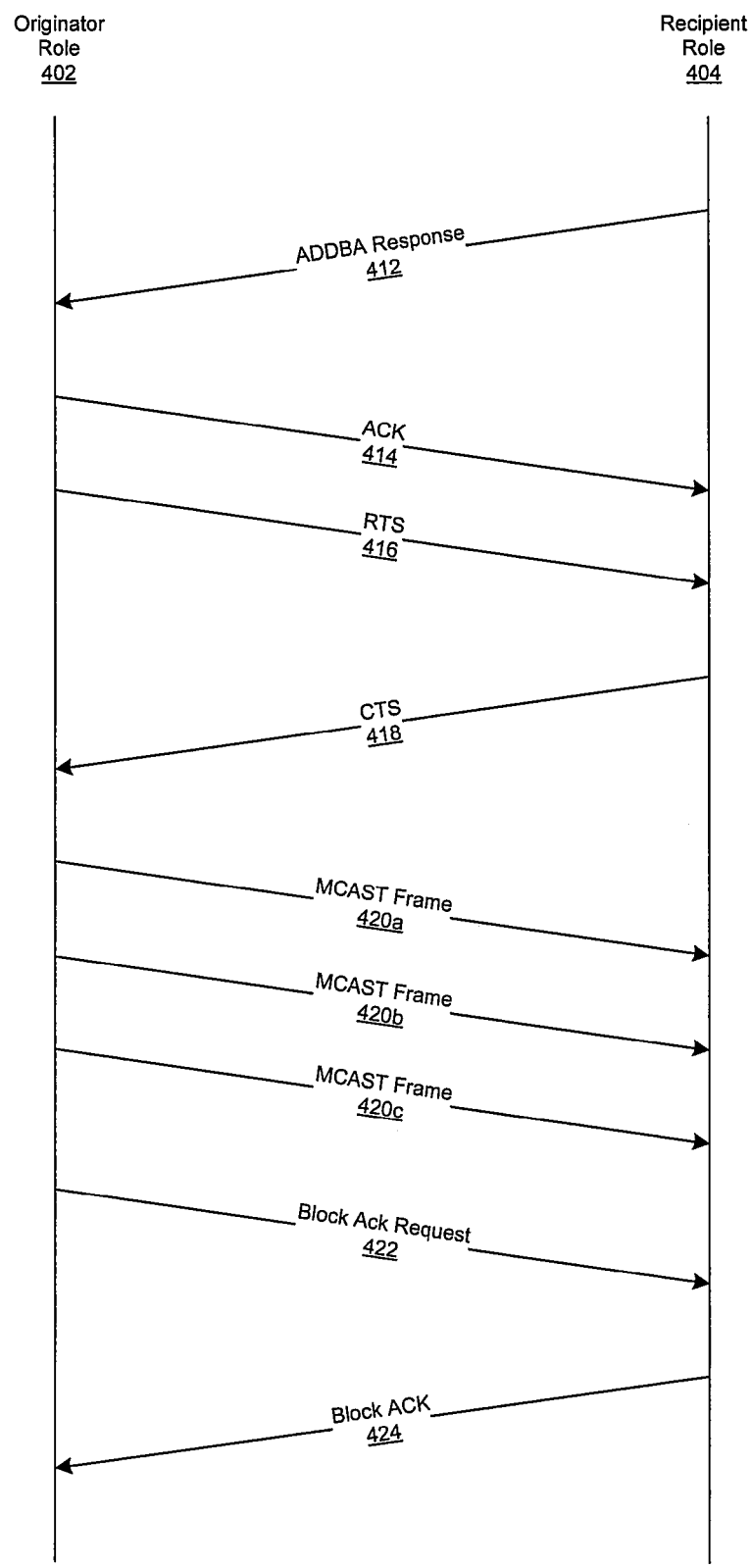
FIG. 4 is a diagram illustrating an exemplary message exchange in a multicast retry-enabled multicast flow, in accordance with an embodiment of the invention.

FIG. 4 is a diagram illustrating an exemplary message exchange in a multicast retry-enabled multicast flow, in accordance with an embodiment of the invention. Referring to FIG. 4, there is shown an originator role 402 and a recipient role 404. The originator role 402 and recipient role 404 may exchange a plurality of frames during a multicast retry-enabled multicast flow, in accordance with an embodiment of the invention. The originator role 402 may be performed by any STA, which acts as an originator STA for transmitting multicast frames to recipient STAs within a multicast group. The recipient role 404 may be performed by any STA, which acts as a recipient STA for receiving multicast frames within a multicast group.

Referring to FIG. 4, frame 412 comprises an unsolicited enhanced ADDBA response frame which is sent from a recipient STA to an originator STA. The enhanced ADDBA response frame is substantially described above. The frame 412 may be sent by any STA within a multicast group, which communicates an ability to perform MCAST retry recipient functions. In various embodiments of the invention, a plurality of STAs within a multicast group 102, for example recipient STAs MG_R1 114 and MG_R2 116 may each transmit an unsolicited ADDBA response frame to the originator STA MG_O 112. Receipt of frame 412, from any recipient STA, by the originator STA enables MCAST retry within the multicast group. Frame 414 comprises an ACK frame, which is sent by the originator STA to the recipient STA that sent frame 412.

In various embodiments of the invention, an originator STA MG_O 112 may select a STA referred to as a responder STA. The responder STA, which is selected by the originator STA MG_O 112 may or may not be a member of the multicast group 102 to which the originator STA may transmit the one or more MCAST frames 122. The responder STA, which is selected by the originator STA MG_O 112, may be able to perform MCAST retry recipient functions, or MCAST-retry capable. In an exemplary embodiment of the invention, the originator STA may select a responder STA from a plurality of candidate STAB by assessing the probability that transmitted frames may be successfully received at each of the candidate STAB. For example, the originator STA may determine a received signal strength indicator (RSSI) value for each of the candidate STAs, or the originator STA may determine a packet error rate (PER) value for frames received at each of the candidate STAs. The RSSI and/or PER values may be determined based on feedback information from each of the candidate STAs, or the originator STA may determine RSSI and/or PER values based on signals received from each of the candidate STAs. In various embodiments of the invention, a responder STA may be selected each time the originator STA transmits an MCAST frame sequence 122. The selected responder STA may be selected independently from responder STAs selected during preceding and/or subsequent transmitted MCAST frame sequences.

In various exemplary embodiments of the invention, the responder STA selected by the originator STA may be the candidate STA associated with the lowest RSSI value and/or highest PER value. In this case, the communication channel, or communication link, between the originator STA and the responder STA may be referred to as the least reliable communication link among the communication links between the originator STA and each of the candidate STAs. In other exemplary embodiments of the invention, the responder STA selected by the originator STA may be the candidate STA associated with the highest RSSI value and/or lowest PER value. In this case, the communication link between the originator STA and the responder STA may be referred to as the most reliable communication link. In the exemplary system shown in FIG. 1, the responder STA is STA MG_R1 114.

In various exemplary embodiments of the invention, which utilizes carrier sense multiple access—collision avoidance (CSMA-CA) medium access mechanisms, the originator STA MG_O 112 may transmit a frame to request access to the communication medium prior to commencing transmission of a sequence of one or more MCAST frames 122. In an exemplary embodiment of the invention, the originator STA MG_O 112 may transmit a request to send (RTS) frame 416 to the selected responder STA MG_R1 114. The RA field in the RTS frame may comprise an address for the selected responder STA, for example RA=MG_R1_Addr. The responder STA MG_R1 114 may respond to the RTS frame 416 by transmitting a clear to send (CTS) frame 418 to the originator STA MG_O 112. The RTS 416 and CTS 418 frame exchange may enable the originator STA MG_O 112 to reserve access to the communication medium for a time duration that is sufficient to transmit the MCAST frame sequence 122. The time duration may be determined based on a time value for the duration (DUR) field in the MAC header portion of the RTS frame 416. The transmission of frames 416 and 418 may be referred to as an RTS/CTS frame exchange.

In various embodiments of the invention, the STA with which the originator STA performs an RTS/CTS frame exchange may be the responder STA. After transmitting one or more MCAST frames 122 in an MCAST frame sequence, the originator STA MG_O 112 may expect to receive an MCAST ACK frame from the responder STA.

The originator STA MG_O 112 may transmit an MCAST frame sequence 122. As shown in FIG. 4, the MCAST frame sequence 122 may comprise one or more MCAST frames 420a, 420b, ..., and 420c. Each of the MCAST frames 420a, 420b, ..., and 420c may comprise a TID field, which comprises the MCAST flow identifier for the MCAST frame sequence 122, MC1. Each of the MCAST frames 420a, 420b, ..., and 402c may comprise an SN field, which comprises a distinct sequence number value, SNval. Various embodiments of the invention may be practiced when one or more of the MCAST frames 420a, 420b, ..., and 420c comprise an aggregated PDU or an aggregated service data unit (SDU), for example an aggregated MAC layer PDU (A-MPDU) and/or an aggregated MAC layer SDU (A-MSDU).

After transmitting the MCAST frames 420a, 420b, ..., and 420c, the originator STA MG_O 112 may transmit a block ACK request (BR) frame 422. The BR frame 422 may comprise an RA field, which comprises the MCAST group address, MG_Addr, a TA field, which comprises the MG_O 112 address, MG_O_Addr and a TID field, which comprises the MCAST flow identifier, MC1. The BR frame 422 may comprise a field, for example an ACK policy field, which is set to a value that indicates that the originator STA MG_O 112 requests an immediate reply to the BR frame 422 from the responder STA MG_R1 114. In an exemplary embodiment of the invention, the ACK policy field may be set to a value, which corresponds to "normal", as described in IEEE standard 802.11-2007. The BR frame 422 may also comprise a sequence window field, which comprises a sequence number value. The sequence window field contained within the BR frame 422 may communicate a minimum sequence number value, Bwin, to each of the STAs receiving the BR frame 422, which indicates that the originator STA MG_O 112 requests a BA frame that acknowledges successful reception of MCAST frames for which SNval≧Bwin. STAs receiving the BR frame 422 may determine which frames were received in the MCAST sequence 420a, 420b, ..., and 420c for which SNval≧Bwin.

In various embodiments of the invention, transmission of the BR frame 422 may be preceded by a RTS/CTS frame exchange. Furthermore, the originator STA MG_O 112 may transmit the BR frame 422 during a transmission opportunity in which no MCAST frames have been transmitted.

In various embodiments of the invention, the selected responder STA MG_R1 114 may transmit a block acknowledgment (BA) frame 424 to the originator STA MG_O 112 in response to the BR frame 422. Referring to FIG. 1, an exemplary BA frame 424 is shown as the MCAST ACK frame 132. The BA frame 424 may comprise one or more sequence numbers, which enable the originator STA MG_O 112 to determine which, if any, of the transmitted MCAST frames 420a, 420b, ..., and 420c were successfully received by the responder STA MG_R1 114.

In instances, when the responder STA MG_R1 114 does not transmit a BA frame 424, another recipient STA within the multicast group 102, for example recipient STA MG_R2 116, may subsequently transmit a BA frame to the originator STA MG_O 112. The recipient STA MG_R2 116 may transmit the BA frame at a time instance when the STA MG_R2 116 has an opportunity to transmit frames to the originator STA MG_O 112. A BA frame that is transmitted by the recipient STA MG_R2 116 may comprise one or more sequence numbers, which enable the originator STA MG_O 112 to determine which, if any, of the transmitted MCAST frames 420a, 420b, ..., and 420c were successfully received by the responder STA MG_R2 116.

In various embodiments of the invention, a recipient STA MG_R2 116 may receive a BA frame 422, which was transmitted by another recipient STA within the multicast group 102, for example the responder STA MG_R1 114. In instances when the recipient STA MG_R2 116 determines that it has received all of the frames indicated as having been received in the BA frame 422, transmitted by the responder STA MG_R1 114, recipient STA MG_R2 116 may not transmit a BA frame 422 to the originator STA MG_O 112. In instances when the recipient STA MG_R2 116 determines that it has not received frames that are indicated as having been received in the BA frame 422, transmitted by the responder STA MG_R1 114, the recipient STA MG_R2 116 may transmit a BA frame to the originator STA MG_O 112.

In various embodiments of the invention, a STA, which responds to the BR frame 422, may transmit an ACK frame instead of a BA frame 424. Upon receipt of one or more BA frames 424 from one or more recipient STAs 114 and 116 within the multicast group 102, the originator STA 102 may determine which, if any, of the transmitted frame in the MCAST frame sequence 420a, 420b, ..., and 420c may have not been successfully received and accepted by at least one of the recipient STAs 114 and 116 within the multicast group 102. Such frames may be referred to as "missing frames". An originator STA MG_O 112 may retransmit missing frames by multicasting the missing frames to each of the recipient STAs within the multicast group 102. Retransmission of the one or more missing frames may or may not be preceded by an RTS/CTS frame exchange. Any STA within a multicast group may concurrently perform an originator role and a recipient role. Furthermore, at any given time instant, there may be a plurality of concurrently active MCAST flows.

Each STA performing in a recipient role may record sequence numbers for multicast frames for each uniquely identified MCAST flow received at the STA. Each STA performing in a recipient role may utilize the sequence number information to generate a BA frame for each identified MCAST flow. The BA frame for a given MCAST flow may indicate multicast frames that were successfully received and/or accepted at the STA for the given MCAST flow. Each STA performing in an originator role may record sequence numbers for multicast frames for each uniquely identified MCAST flow transmitted by the STA. Each STA performing in the originator role may utilize the sequence number information to generate a BR frame for each identified MCAST flow. The BR frame for a given MCAST flow may indicate a Bwin value, which indicates a current minimum sequence number value for the given MCAST flow.

In various embodiments of the invention, a plurality of STAs, which perform in an originator role, may utilize the same MCAST group address. In such cases, any STA, which performs an originator role in the multicast group while utilizing a common MCAST group address and/or has enabled MCAST retry within the multicast group and/or is capable of supporting MCAST retry originator and/or recipient functions, may transmit a BA frame in response to a BR frame transmitted by any other STA, which performs an originator role in the multicast group while utilizing the common MCAST group address. An originator STA, which receives a BA frame may transmit an ACK frame in response to the received BA frame when the BA frame was sent from the selected response STA and/or when the selected response STA has enabled MCAST retry within the multicast group and/or when the BA frame comprises an RA field, which comprises the MCAST group address, MG_Addr. An originator STA, which receives a BA frame may transmit an ACK frame in response to the received BA frame when the BA frame was sent from a STA, which performs an originator role in the multicast group while utilizing a common MCAST group address and/or has enabled MCAST retry within the multicast group and/or is capable of supporting MCAST retry originator and/or recipient functions and/or when the received BA frame comprises an RA field, which comprises the MCAST group address, MG_Addr.

In various embodiments of the invention, a transmitted MCAST frame sequence may comprise frames of type QoS Data. Such frames may comprise an ACK policy field which indicates no acknowledgment (NOACK) or normal ACK (NormalACK). Recipient STAs which have enabled MCAST retry within a multicast group may receive and record successful receipt and acceptance of frames within an MCAST flow in which received frames comprise an ACK policy field value that corresponds to NOACK or NormalACK. A recipient STA may not transmit a BA frame 424 when the originator STA has not transmitted a BR frame 422. The recipient STA may not transmit a BA frame 424 when the recipient STA does not detect any missing frames in the received MCAST frame sequence 420a, 420b, ..., and 420c.

In various embodiments of the invention a selected responder STA may transmit a BA frame 424 or an ACK frame upon receipt of the last frame in the MCAST frame sequence 420a, 420b, ..., and 420c. In an exemplary system based on IEEE 802.11 specifications, the more field and/or ACK policy field within the transmitted frames may be set to values that indicate which of the frames in the MCAST frame sequence is the last frame. When the responder STA determines based on the contents of the more field and/or ACK policy field that a received frame is the last frame in the MCAST frame sequence, the responder STA may transmit a BA frame 424 or an ACK frame.

In various embodiments of the invention, an originator STA may disable MCAST retry recipient functions at one or more selected recipient STAs by transmitting a DELBA frame to the selected one or more recipient STAs. The transmission of the DELBA frame may inhibit the selected one or more recipient STAs from transmitting one or more BA frames to the originator STA following transmission of a MCAST frame sequence. In various embodiments of the invention, the DELBA frame may be an enhanced DELBA frame. An originator STA may solicit one or more selected recipient STAs to enable MCAST retry recipient functions. For example, the originator STA may transmit an enhanced ADDBA request frame to each of the selected recipient STAs. The enhanced ADDBA request frame format may comprise enhancements, which are substantially similar to the enhancements described above for the enhanced ADDBA response frame. For example, the enhanced ADDBA request frame may comprise an extended field, which comprises the MCAST group address, MG_Addr. Selected recipient STAs may respond to the enhanced ADDBA request frame by transmitting a solicited enhanced ADDBA response frame.

Recipient STAs, which attempt to enable MCAST retry recipient functions, may send a solicitation to the originator STA. For example, a recipient STA may transmit an enhanced ADDBA request frame to the originator STA. By transmitting the enhanced ADDBA request frame, the recipient STA may be soliciting the originator STA to permit the recipient STA to enable MCAST retry recipient functions. The originator STA may respond to the enhanced ADDBA request frame by transmitting an enhanced ADDBA response frame to the recipient STA. The enhanced ADDBA response frame may comprise a field, such as a status code field, which indicates whether the originator STA has granted or refused permission to enable MCAST retry recipient functions at the recipient STA.

Figure 5:
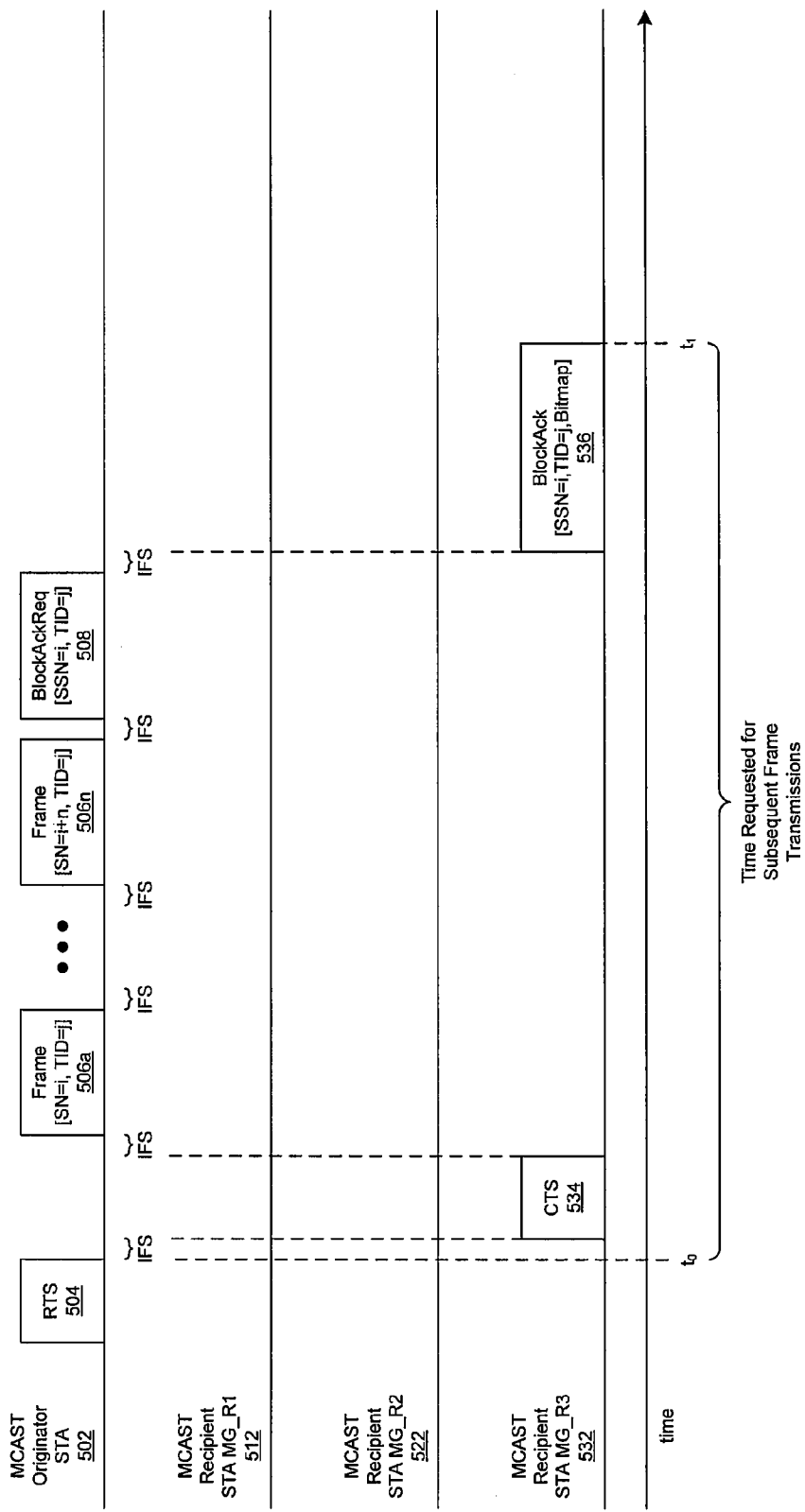
FIG. 5 is a diagram illustrating an exemplary operation of multicast retry that utilizes a block acknowledgment message, in accordance with an embodiment of the invention.

FIG. 5 is a diagram illustrating an exemplary operation of multicast retry that utilizes a block acknowledgment message, in accordance with an embodiment of the invention. Referring to FIG. 5, there is shown a MCAST originator STA MG_O 502, a MCAST recipient STA MG_R1 512, an MCAST recipient STA MG_R2 522 and a MCAST recipient STA MG_R3 532. The MCAST originator STA MG_O 502, and MCAST recipient STAs 512, 522 and 532 are members of a multicast group in which MCAST frames are transmitted utilizing an MCAST group address, MG_Addr. Each of the recipient STAs 512, 522 and 532 have enabled recipient functions for MCAST retry within the multicast group. For example, in an exemplary embodiment of the invention, each of the recipient STAs has previously transmitted an enhanced ADDBA frame comprising the MCAST group address, MG_Addr. The RA field within each of the transmitted enhanced ADDBA frames may comprise the MCAST group address, MG_Addr.

In an exemplary embodiment of the invention, the MCAST originator STA MG_O 502 may select recipient STA MG_R3 532 to be the responder STA for MCAST retry within the multicast group. The originator STA MG_O 502 may transmit an RTS frame 504 to the recipient STA MG_R3 532. The RA field within the RTS frame 504 may comprise an address for the recipient STA MG_R3 532, MG_R3_Addr. The recipient STA MG_R3 532 may respond to the RTS frame 504 by transmitting a CTS frame 534 to the originator STA MG_O 502.

The originator STA MG_O 502 may transmit an MCAST frame sequence 506a, ..., 506n. Each of the transmitted MCAST frames may comprise RA=MG_Addr. Each of the transmitted MCAST frames may comprise an SN field and a TID field. As shown in FIG. 5, TID=j and the SN field is incremented for each successive transmitted MCAST frame in the MCAST frame sequence. Each of the transmitted MCAST frames may comprise a (TA, RA, TID) tuple that identifies the MCAST frames as being associated with a common MCAST flow.

After transmitting the MCAST frame sequence 506a, ..., 506n, the originator STA MG_O 502 may transmit a BR frame 508. The BR frame may comprise RA=MG_Addr, a minimum, or starting, sequence number (SSN) field SSN=i, and an ACK policy field that corresponds to an ACK policy=NormalACK. The SSN value may correspond to the SN value for the first frame transmitted in the MCAST frame sequence 506a, ..., 506n. The BR frame 508 may also comprise a TID=j. The responder STA MG_R3 532 may respond to the received BR frame 508 by transmitting a BA frame 536. The BA frame 536 may comprise RA=MG_Addr, SSN=i and TID=J. The BA frame 536 may also comprise a bitmap field, which indicates which of the frames in the MCAST frame sequence 506a, ..., 506n, were successfully received and/or accepted at the responder STA MG_R3 532.

Figure 6:
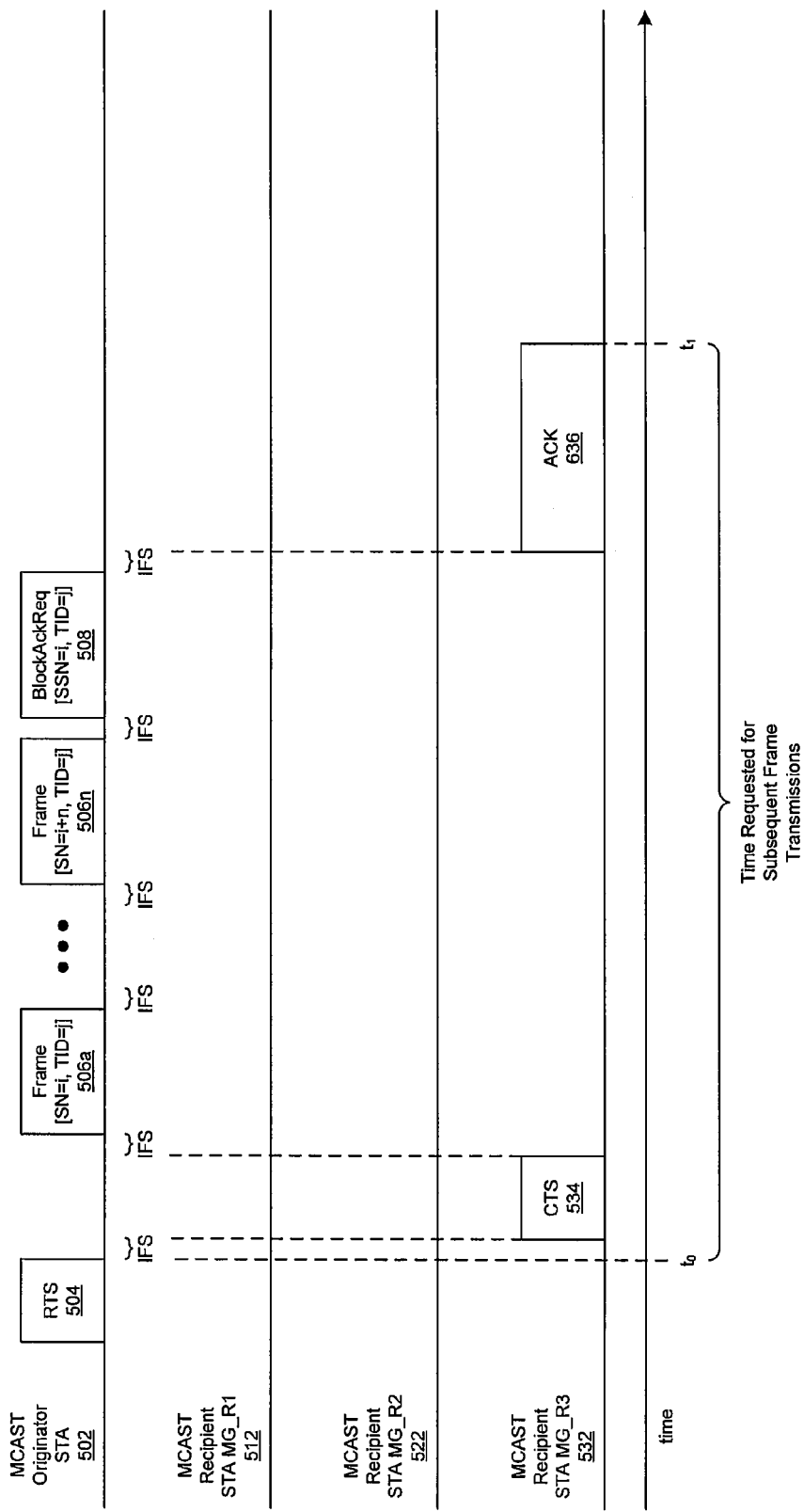
FIG. 6 is a diagram illustrating an exemplary operation of multicast retry that utilizes an acknowledgment message, in accordance with an embodiment of the invention.

FIG. 6 is a diagram illustrating an exemplary operation of multicast retry that utilizes an acknowledgment message, in accordance with an embodiment of the invention. FIG. 6 is substantially similar to FIG. 5 with the distinction that the responder STA MG_R3 532 responds to the BR frame 508 by transmitting an ACK frame 636. The ACK frame 636 may comprise RA=MG_O_Addr.

Figure 7:
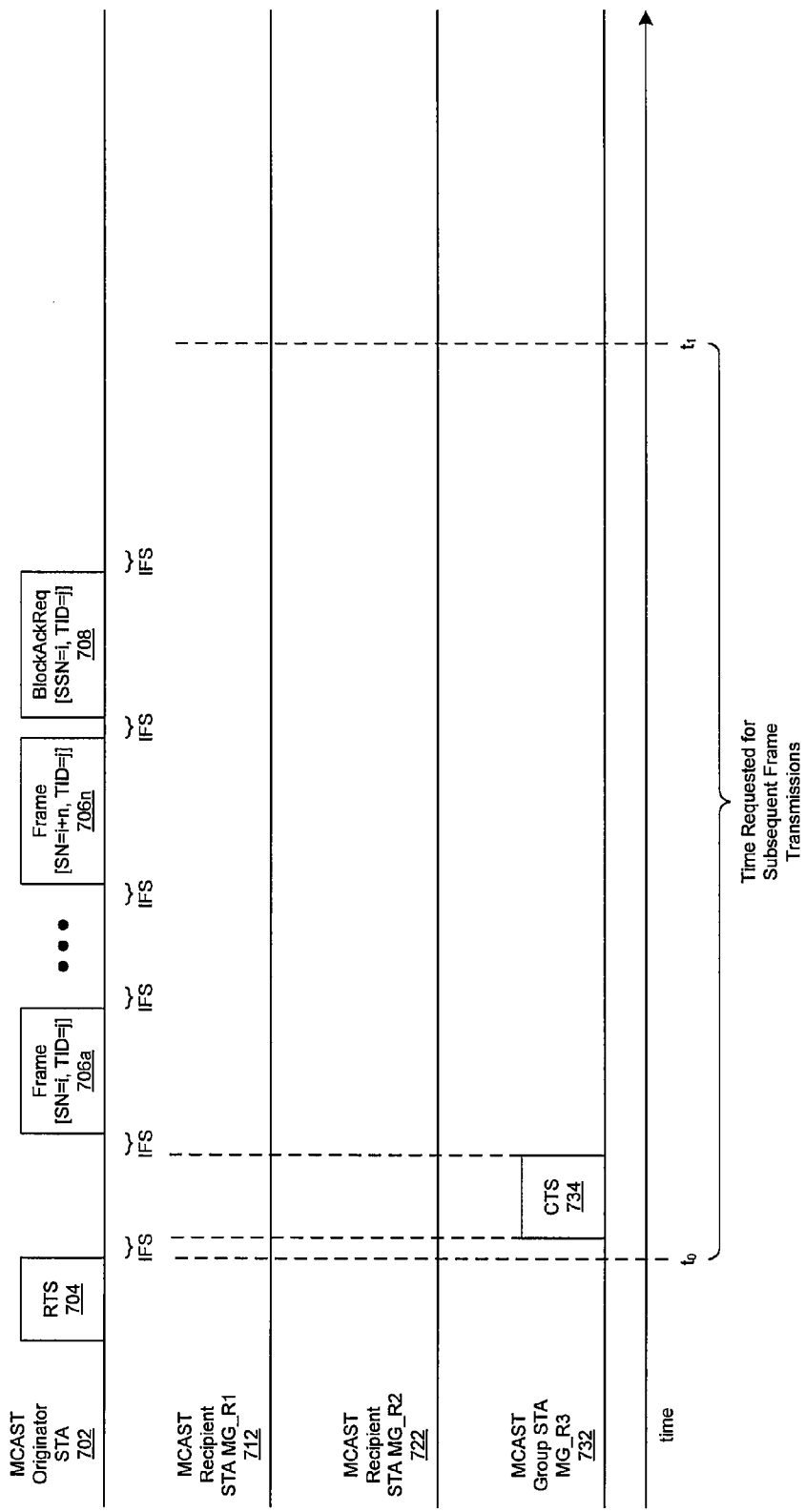
FIG. 7 is a diagram that shows exemplary operation of multicast retry when the selected multicast responder has not enabled recipient functions for multicast retry, in accordance with an embodiment of the invention.

FIG. 7 is a diagram illustrating an exemplary operation of multicast retry when the selected multicast responder has not enabled recipient functions for multicast retry, in accordance with an embodiment of the invention. Referring to FIG. 7, there is shown an MCAST originator STA MG_O 702, an MCAST recipient STA MG_R1 712, an MCAST recipient STA MG_R2 722 and an MCAST group STA MG_R3 732. The MCAST originator STA MG_O 702 MCAST recipient STAs 712 and 722 and MCAST group STA 732 are members of a multicast group in which MCAST frames are transmitted utilizing an MCAST group address, MG_Addr. Each of the recipient STAs 712 and 722 have enabled recipient functions for MCAST retry within the multicast group. The MCAST group STA 732 has not enabled recipient functions for MCAST retry within the multicast group.

In an exemplary embodiment of the invention, the MCAST originator STA MG_O 702 may select MCAST group STA MG_R3 732 to be the responder STA for MCAST retry within the multicast group. The originator STA MG_O 702 may transmit an RTS frame 704 to the MCAST group STA MG_R3 732. The RA field within the RTS frame 704 may comprise an address for the MCAST group STA MG_R3 732, MG_R3_Addr. The MCAST group STA MG_R3 732 may respond to the RTS frame 704 by transmitting a CTS frame 734 to the originator STA MG_O 702.

The originator STA MG_O 702 may transmit an MCAST frame sequence 706a, ..., 706n. Each of the transmitted MCAST frames may comprise RA=MG_Addr. Each of the transmitted MCAST frames may comprise an SN field and a TID field. As shown in FIG. 7, TID=j. Each of the transmitted MCAST frames may comprise a (TA,RA,TID) tuple that identifies the MCAST frames as being associated with a common MCAST flow.

After transmitting the MCAST frame sequence 706a, ..., 706n, the originator STA MG_O 702 may transmit a BR frame 708. The BR frame may comprise RA=MG_Addr, SSN=i, and an ACK policy field that corresponds to an ACK policy=NormalACK. The SSN value may correspond to the SN value for the first frame transmitted in the MCAST frame sequence 706a, ..., 706n. The BR frame 708 may also comprise a TID=j. However, since the responder STA MG_R3 732 has not enabled recipient functions for MCAST retry within the multicast group, the responder STA MG_R3 732 may not respond to the received BR frame 708.

Figure 8:
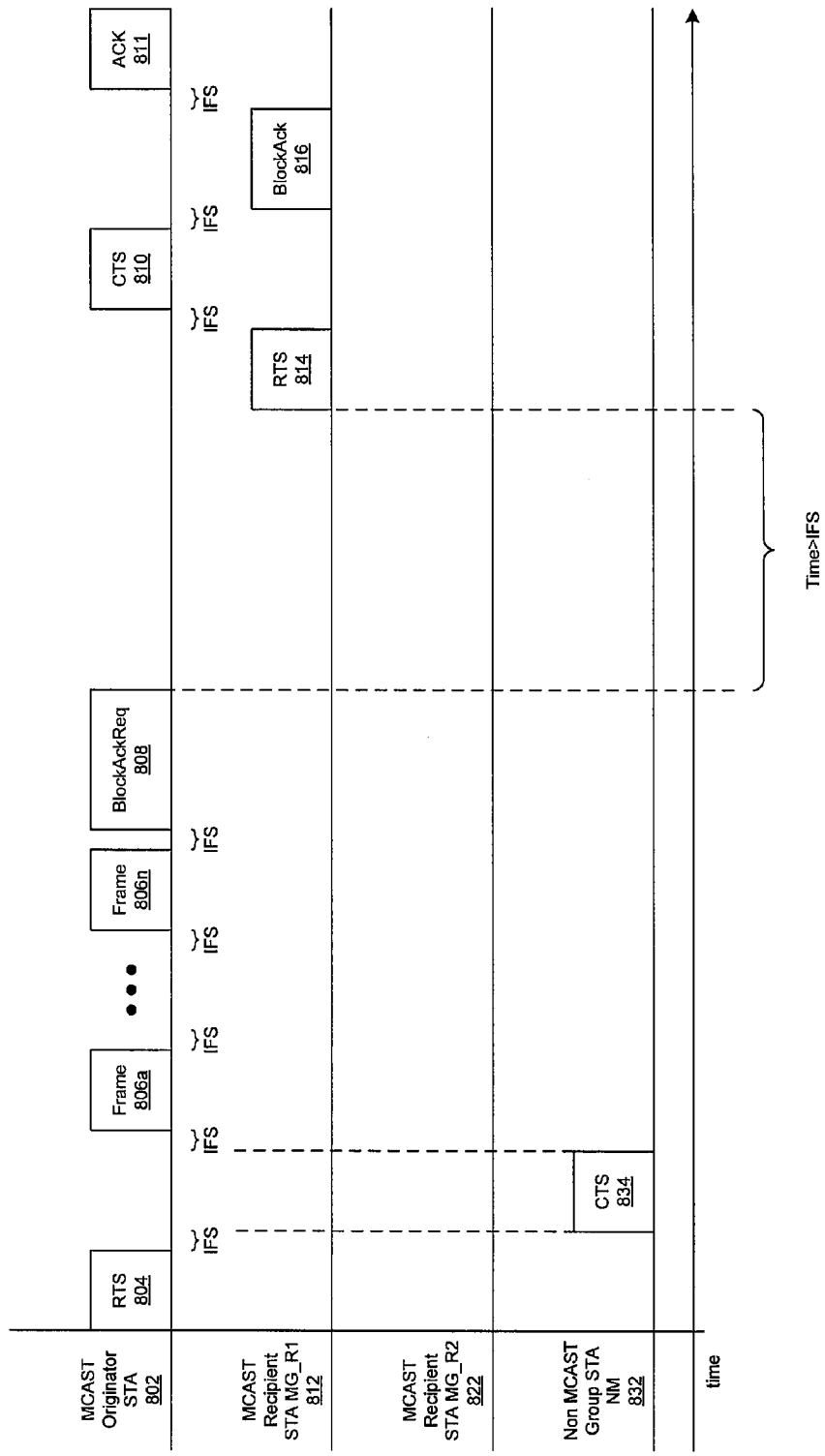
FIG. 8 is a diagram that shows exemplary operation of multicast retry when the selected multicast responder is not a member of the multicast group, in accordance with an embodiment of the invention.

FIG. 8 is a diagram illustrating exemplary operation of multicast retry when the selected multicast responder is not a member of the multicast group, in accordance with an embodiment of the invention. Referring to FIG. 8, there is shown an MCAST originator STA MG_O 802, an MCAST recipient STA MG_R1 812, an MCAST recipient STA MG_R2 822 and a non-MCAST group (non-group) STA NM 832. The MCAST originator STA MG_O 802 and MCAST recipient STAs 812 and 822 and are members of a multicast group in which MCAST frames are transmitted utilizing an MCAST group address, MG_Addr. The Non-group STA NM 832 is not a member of the MCAST group to which STAs 802, 812 and 822 are members. Each of the recipient STAs 812 and 822 have enabled recipient functions for MCAST retry within the multicast group. The non-group STA 832 has not enabled recipient functions for MCAST retry.

In an exemplary embodiment of the invention, the MCAST originator STA MG_O 802 may select non-group STA NM 832 to be the responder STA for MCAST retry within the multicast group. The originator STA MG_O 802 may transmit an RTS frame 804 to the non-group STA NM 832. The RA field within the RTS frame 804 may comprise an address for the non-group STA NM 832, NM_Addr. The non-group STA NM 832 may respond to the RTS frame 804 by transmitting a CTS frame 834 to the originator STA MG_O 802.

The originator STA MG_O 802 may transmit an MCAST frame sequence 806a, ..., 806n. Each of the transmitted MCAST frames may comprise RA=MG_Addr. Each of the transmitted MCAST frames may comprise an SN field and a TID field. As shown in FIG. 8, TID=j and the SN field is incremented for each successive transmitted MCAST frame in the MCAST frame sequence. Each of the transmitted MCAST frames may comprise a (TA,RA,TID) tuple that identifies the MCAST frames as being associated with a common MCAST flow.

After transmitting the MCAST frame sequence 806a, ..., 806n, the originator STA MG_O 802 may transmit a BR frame 808. The BR frame may comprise RA=MG_Addr, SSN=i, and an ACK policy field that corresponds to an ACK policy=NormalACK. The SSN value may correspond to the SN value for the first frame transmitted in the MCAST frame sequence 806a, . . . , 806n. The BR frame 808 may also comprise a TID=j. However, since the responder STA NM 832 is not a member of the multicast group and has not enabled recipient functions for MCAST retry within the multicast group, the responder STA NM 832 may discard the received BR frame 808 and/or may not respond to the received BR frame 808.

After detecting that no BA frame has been transmitted in response to the BR frame 808, recipient STA MG_R1 812 may attempt to transmit a BA frame in response to the BR frame 808. The recipient STA MG_R1 812 may transmit an RTS frame 814 to the originator STA MG_O 812. In response, the originator STA MG_O 802 may transmit a CTS frame 810 to the recipient STA MG_R1 812. Upon receiving the CTS frame 810, the recipient STA MG_R1 812 may transmit a BA frame 816 in response to the previously transmitted BR frame 808. Upon receipt of the BA frame from the recipient STA MG_R1 812, the originator STA 802 may transmit an ACK frame 811 to the recipient STA MG_R1 812.

Aspects of a method and system for multicast retry in a communication network may include an originator station device 112 within a multicast group 102 that enables transmission of one or more PDUs 122 via a network utilizing a multicast address, MG_Addr. The transmitted one or more PDUs may be associated with an identified multicast flow. The multicast flow may be identified based on the MG_Addr, an address for the originator station device (MG_O_Addr) and/or a transmit flow identifier (TID). Subsequent to transmission of the one or more PDUs, the originator station device may receive one or more acknowledgment PDUs. In various embodiments of the invention, an acknowledgment PDU may comprise a BA frame 424. The received acknowledgment PDUs may enable the originator station device to determine whether the transmitted PDUs 122 were successfully received by one or more destination terminal devices 114 and 116. One or more of the PDUs 122 may be retransmitted based on the determination. The originator station device and one or more destination terminal devices may be members of a multicast group 102. The multicast group may be identified based on the multicast address MG_Addr.

The originator station device 112 may receive the acknowledgment PDUs in response to transmission of an acknowledgment request PDU. In various embodiments of the invention, an acknowledgment request PDU may comprise a BR frame 422. The originator station device 112 may select a responder station 114 from the one or more destination terminal devices. The originator station device 112 and the selected responder station 114 may perform an RTS/CTS frame exchange. The originator station device 112 may receive the acknowledgment PDUs from the selected responder device 114. The originator station device 112 may receive one or more supplemental acknowledgment PDUs from one of the destination terminal devices 116 exclusive of the selected responder station 114. The originator station device 112 may receive each of the acknowledgment PDUs and/or supplemental acknowledgement PDUs utilizing the multicast address, MG_Addr. The originator station device 112 may receive the acknowledgment PDUs from one of the destination terminal devices 116 exclusive of the selected responder station 114 in instances when the selected responder station 114 fails to transmit the acknowledgment PDUs 424.

The originator station device 112 may receive one or more multicast retry enablement PDUs from at least one of the one or more destination terminal devices 114 and 116. In an exemplary embodiment of the invention, the multicast retry enablement PDU may comprise an enhanced ADDBA response frame 412. The received multicast retry enablement PDU may enable the originator station device to retransmit one or more PDUs 122.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for multicast retry in a communication network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information in a communication network, the method comprising:
   in a terminal device operable for wireless communication:
      enabling said terminal device to serve as an originator terminal device in multicast operation, wherein said originator terminal device is configured to determine whether to commence transmission of multicast protocol data units;
      when said terminal device determines to commence transmission of said multicast protocol data units, transmitting said multicast protocol data units via a network of the communication network utilizing a multicast address;
      receiving one or more acknowledgment protocol data units via a responder destination terminal device of one or more destination terminal devices subsequent to said transmitting;
      determining whether said transmitted multicast protocol data units were successfully received at said one or more destination terminal devices based on said received one or more acknowledgment protocol data units;

retransmitting those of said transmitted multicast protocol data units, which based on said determining, unsuccessfully received at said one or more destination terminal devices, wherein said retransmission by said terminal device is enabled based on information received from said responder destination terminal device; and receiving a supplemental acknowledgment protocol data unit from at least one of said one or more destination terminal devices exclusive of said responder destination terminal device, wherein each of said acknowledgement protocol data unit and said supplemental acknowledgment protocol data unit are received utilizing said multicast address.

2. The method according to claim 1, comprising receiving said one or more acknowledgment protocol data units in response to transmission of an acknowledgment request protocol data unit.

3. The method according to claim 1, further comprising receiving a multicast retry enablement protocol data unit from at least one of said one or more destination terminal devices.

4. The method according to claim 3, further comprising retransmitting selected one or more multicast protocol data units in response to said received multicast retry enablement protocol data unit.

5. The method according to claim 1, wherein said one or more destination terminal devices are associated with a multicast group.

6. The method according to claim 5, comprising identifying said multicast group based on said multicast address.

7. The method according to claim 1, wherein said transmitted one or more multicast protocol data units are associated with a multicast flow.

8. The method according to claim 7, comprising identifying said multicast flow based on said multicast address, an address for said originator terminal device and a transmit flow identifier.

9. The method according to claim 1, further comprising receiving a clear to send (CTS) protocol data unit prior to said transmitting of said one or more multicast protocol data units utilizing said multicast address.

10. The method according to claim 9, further comprising transmitting a request to send (RTS) protocol data unit prior to receiving said clear to send protocol data unit.

11. The method according to claim 1, further comprising selecting said responder destination terminal device that is not one or said one or more destination terminal devices.

12. The method according to claim 11, further comprising receiving said one or more acknowledgment protocol data units from at least one of said one or more destination terminal devices.

13. A system for communicating information in a communication network system, said system comprising:

one or more circuits for use in a terminal device that is operable for wireless communication, wherein said one or more circuits for use in said terminal device are configured to enable said terminal device to serve as an originator terminal device in multicast operation, said originator terminal device configured to determine whether to commence transmission of multicast protocol data units;

said one or more circuits enable said transmission of said multicast protocol data units via a network of the communication network system utilizing a multicast address when said terminal device determines to commence transmission of said multicast protocol data units;

said one or more circuits enable reception of one or more acknowledgment protocol data units via a responder destination terminal device of one or more destination terminal devices subsequent to said transmission, said responder destination terminal device selected by said originator terminal device;

said one or more circuits enable determination of whether said transmitted multicast protocol data units were successfully received at one or more destination terminal devices based on said received one or more acknowledgment protocol data units;

said one or more circuits enable retransmission of those said transmitted multicast protocol data units, which based on said determination, unsuccessfully received at said one or more destination terminal devices, wherein said retransmission is enabled based on information received from said responder destination terminal devices; and wherein said one or more circuits enable reception of one or more supplemental acknowledgment protocol data units from at least one of said one or more destination terminal devices exclusive of said responder destination terminal device, and enable reception of each of said acknowledgement protocol data unit and each of said one or more supplemental acknowledgment protocol data units are received utilizing said multicast address.

14. The system according to claim 13, wherein said one or more circuits enable reception of said one or more acknowledgment protocol data units in response to transmission of an acknowledgment request protocol data unit.

15. The system according to claim 13, wherein said one or more circuits enable reception of a multicast retry enablement protocol data unit from at least one of said one or more destination terminal devices.

16. The system according to claim 15, wherein said one or more circuits enable retransmission of said selected one or more protocol data units in response to said received multicast retry enablement protocol data unit.

17. The system according to claim 13, wherein said one or more destination terminal devices are associated with a multicast group.

18. The system according to claim 17, wherein said one or more circuits enable identification of said multicast group based on said multicast address.

19. The system according to claim 13, wherein said transmitted one or more multicast protocol data units are associated with a multicast flow.

20. The system according to claim 19, wherein said one or more circuits enable identification of said multicast flow based on said multicast address, an address for said originator terminal device and a transmit flow identifier.

21. The system according to claim 13, wherein said one or more circuits enable reception of a clear to send (CTS) protocol data unit prior to said transmitting of said one or more multicast protocol data units utilizing said multicast address.

22. The system according to claim 21, wherein said one or more circuits enable transmission of a request to send (RTS) protocol data unit prior to receiving said CTS protocol data unit.

23. The system according to claim 13, wherein said one or more circuits enable selection of said responder destination terminal device that is not one of said one or more destination terminal devices.

24. The system according to claim 23, wherein said one or more circuits enable reception of said one or more acknowledgment protocol data units from at least one of said one or more destination terminal devices.

* * * * *

UNITED STATES PATENT AND TRADEMARK OFFICE
CERTIFICATE OF CORRECTION

PATENT NO. : 8,218,468 B2  Page 1 of 1
APPLICATION NO. : 12/209379
DATED : July 10, 2012
INVENTOR(S) : Matthew J. Fischer It is certified that error appears in the above-identified patent and that said Letters Patent is hereby corrected as shown below:

Col. 17, line 45, in claim 11: replace "one or" with --one of--

Signed and Sealed this
Twenty-sixth Day of February, 2013

Teresa Stanek Rea
*Acting Director of the United States Patent and Trademark Office*